United States Patent
Koenig et al.

[15] 3,663,812
[45] May 16, 1972

[54] X-RAY SPECTROGRAPHIC MEANS HAVING FIXED ANALYZING AND DETECTING MEANS

[72] Inventors: Jude H. Koenig, San Jose, Calif.; James A. Schoeffel, Alton, Ill.; Gene J. Carron, St. Louis County; Lionel K. Walford, St. Louis, both of Mo.

[73] Assignee: McDonnell Douglas Corporation, St. Louis, Mo.

[22] Filed: Feb. 27, 1969

[21] Appl. No.: 802,962

[52] U.S. Cl. .................. 250/49.5 PE, 250/51.5, 250/65 R, 250/105
[51] Int. Cl. ........................................... G01n 23/20
[58] Field of Search .............. 250/51.5, 49.58, 49.59, 65

[56] References Cited

UNITED STATES PATENTS

| | | | |
|---|---|---|---|
| 2,998,524 | 8/1961 | Friedman | 250/86 |
| 3,103,584 | 9/1963 | Shapiro et al. | 250/51.5 |
| 3,113,209 | 12/1963 | Shimula | 250/51.5 |
| 3,160,747 | 12/1964 | DeVries | 250/51.5 |
| 3,213,278 | 10/1965 | Spielberg | 250/51.5 |
| 3,333,099 | 7/1967 | Ladell et al. | 250/51.5 |
| 3,319,064 | 5/1967 | Guernet et al. | 250/51.5 |
| 3,334,228 | 8/1967 | Mattson | 250/51.5 |
| 3,356,844 | 12/1967 | Houbart | 250/51.5 |
| 3,365,574 | 1/1968 | Duncumb | 250/51.5 |
| 3,370,167 | 2/1968 | Sterk | 250/51.5 |
| 3,397,312 | 8/1968 | Okano | 250/51.5 |

*Primary Examiner*—James W. Lawrence
*Assistant Examiner*—C. E. Church
*Attorney*—Charles B. Haverstock

[57] ABSTRACT

Means for analyzing the composition of materials including an excitation source of relatively high energy particles or radiations, and means for directing the particles or radiations from said source at a sample of the material to be analyzed so that X-rays of wavelengths that are characteristic of the sample constituents are given off. The subject means also include specially bent crystal means which are positioned to intercept and diffract the characteristic X-rays in an ordered manner, and detector means onto which the diffracted characteristic X-rays are directed, said X-rays producing responses at the detector means from which qualitative and quantitative information about the characteristic X-rays and hence about the constituents of the sample can be obtained.

25 Claims, 8 Drawing Figures

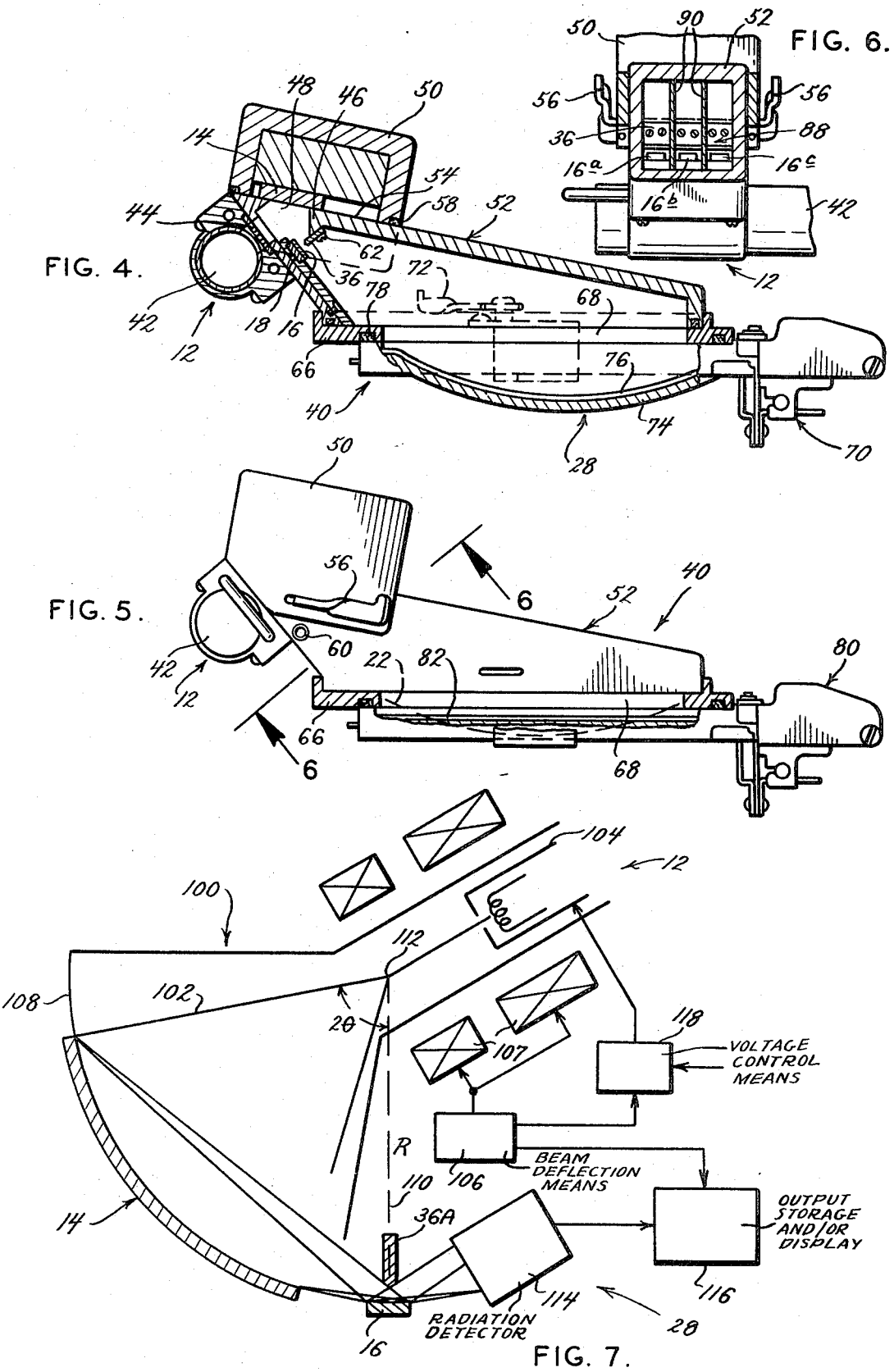

X-RAY SPECTROGRAPHIC MEANS HAVING FIXED ANALYZING AND DETECTING MEANS

The subject invention relates generally to spectrographic elemental analysis equipment and more particularly to those which include cylindrically bent crystals from which X-ray emissions of materials under analysis are diffracted. Either the materials under analysis or means to detect the diffracted X-rays are located in general proximity of the focal circle of the crystal which circle theoretically has a radius of curvature that is one-half of the radius of curvature of the crystal and which is tangent to the midpoint on the curved crystal plane from which the X-rays diffract.

In an increasing number of areas such as industrial manufacturing there are needs for means which enable in situ analysis of elemental composition. This is also true in various geochemical, petroleum and mining areas and the need for such in situ analysis means can be projected in the near future to extraterrestrial exploration and other areas. In the past X-ray spectroscopy has been a popular method employed for qualitative and semi-quantitative elemental analysis of the constituents in a sample material. The conventional types of X-ray spectrographic equipment such as scanning and simultaneous dispersion types, however, have certain distinct disadvantages inherent in their design. For instance most scanning X-ray spectrographic devices now available require highly stabilized high power sources of polychromatic X-radiation with which to irradiate the samples. This X-radiation is directed against the sample to produce fluorescence or secondary X-rays from the elemental constituents of the sample of characteristic wavelengths. The secondary X-rays are directed by parallel plate collimators or by a fine slit located on the focal circle of the device toward a flat analyzing crystal. The analyzing crystal diffracts only those X-rays which strike the planes of the crystal at predeterminable angles which depend on the wavelengths of the X-rays and the lattice spacing of the crystal planes. The X-rays are diffracted from the crystal at angles that are equal to the incident angles. By rotating the flat crystal with respect to the incident secondary X-rays and scanning the diffracted secondary X-rays with a goniometer type detector at twice the angular rate of the crystal rotation, the characteristic radiations diffracted by the analyzing crystal can be measured both in angle from the crystal planes and in intensity. Utilizing Bragg's Law which can be expressed $n \lambda = 2d \sin \theta$, where n is the order number, d the lattice spacing of the analyzing crystal and $\theta$ is the measured angles of diffraction from the crystal planes, the wavelengths $\lambda$ of the X-rays detected can be determined. The wavelengths $\lambda$ are characteristic to the elements emitting them so once the wavelengths have been determined, the elements of the material under analysis can also be determined. The relative intensities of the characteristic X-rays are measures of the amounts of each element in the sample material. To obtain meaningful results to enable quantitative analysis, the known scanning type devices have required relatively complicated and expensive X-ray stabilizing means and scanning means. In addition, the scanning means usually employed require extensive maintenance and almost constant recalibration. Furthermore, since the detectors of such devices see only a relatively small portion of the total secondary X-ray emission at any one time, the total analysis times are usually relatively long. Such scanning type devices beside being complex and costly are also relatively large and difficult to move and therefore even though they have proved of some value for laboratory analyses, they do not lend themselves to portable embodiments and therefore they can be used only to analyze samples which can be brought to a laboratory for examination.

When analyzing samples for traces of elemental constituents it is sometimes required to measure up to 70 spectral lines or wavelengths with such devices. When the percentage of an element is reduced to trace proportions, such as in the parts per million range, very weak spectral line intensities are encountered. The time required to analyze the entire spectrum of such samples with the known scanning X-ray spectrographic means sometimes takes hours or even days because each individual spectral line must be analyzed separately. When prolonged analysis times are required, fluctuations in X-ray tube output severly restrict the quantitative sensitivity.

Known simultaneous dispersion devices, that is devices which scan all or nearly all the secondary X-ray wavelengths simultaneously, have proved useful in some circumstances for X-ray spectrographic analysis. Such devices usually include a flat crystal from which the secondary X-rays are dispersed onto a film. While such devices have the advantage that they are relatively simple and have no moving parts, the films employed generally are incapable of discriminating between the desired and unwanted or spurious X-ray energy. Also as an X-ray detector, film is generally less efficient than modern scintillation, proportional or solid state detectors which heretofore have only been utilized in the scanning type spectrographic means.

The present means combine the advantageous features of the scanning devices and the simultaneous dispersion film devices with other features and at the same time and in many ways overcome the disadvantages of both types of known devices. The present means are also relatively small and compact and are simple structurally having no moving parts. Furthermore, once they leave the factory, the present means never require any alignment, adjustment or maintenance which is a substantial advantage over the known scanning devices which require almost constant adjustment and maintenance as aforesaid. Still further, the present means can simultaneously or nearly simultaneously detect and/or record the spectral lines produced by a specimen being irradiated and therefore they need no costly stabilizing means for their excitation sources since all spectral lines sensed by the detector means are proportional to the average and not the instantaneous excitation as in the case of the known scanning devices.

The subject means can include X-ray tubes, electron guns, proton guns, or radioisotopes in their excitation sources. The X-ray tube, electron gun or proton gun embodiments are normally utilized when adequate power sources are available while the radioisotope embodiments are used when means are required which are completely self-contained and portable. Although radioisotope sources require considerable care when handling they are particularly desirable when the subject means are to be used for remote prospection or extraterrestrial exploration since they require no external power and can be made into very small and compact units, for example, about the size of a cigar box or even smaller.

In the present device the excitation source energy whether it is in the form of X-rays, high energy electrons, high energy protons or particles and/or rays from a radioactive source, is directed against the material under analysis to cause X-rays to be emitted therefrom. These generated X-rays can be of two kinds: the characteristic X-ray spectrum of the sample material under analysis and bremsstrahlung or white radiation. The characteristic X-ray spectrum is produced when the energy from the excitation source is sufficient to knock out inner electrons of the atoms in the sample sometimes called photoelectric absorption. The energy required for this process varies with the atomic number of the atoms involved and is called the K absorption energy in the case of the removal of a K level electron or the L absorption energy in the case of the removal of an L level electron. The inner electron vacancy caused by the electron removal is filled by an electron from the outer electron shells and this is accompanied by the simultaneous emission of an X-ray of characteristic wavelength $\lambda$. The white radiation which is undesirable in this case is generated when, rather than knocking out inner electrons, the excitation source energy is absorbed in the electrical fields about the atoms of the sample.

The characteristic X-rays are directed onto a crystal which in the present device has been bent into a portion of a cylinder with the axis of the cylinder extending parallel to the crystal planes which are used for diffracting rays. Such crystals have the characteristic of generally focusing the X-rays of each single wavelength given off by the sample at some predeterminable point or line on a focal circle which circle is approximately tangent to the center of the reflecting surface of the bent crystal, and which circle has a radius which is one-half of the radius of the crystal planes. Detector means such as film or one or a plurality of detectors similar to those used in the previously discussed scanning devices are normally positioned in proximity to this focal circle to sense the intensity and position of the X-rays diffracted.

With the present means it is possible to include more than one type of analyzing crystal in side-by-side relationship so that more than one range of wavelengths can be analyzed simultaneously. By including more than one analyzing crystal of the same type it is also possible to analyze more than one sample at a time which is particularly convenient in some cases as when an unknown sample is to be compared to a known sample or standard such as in a production line operation. As aforesaid, the present means can also be made relatively small, simple and rugged and are particularly useful in non-destructively analyzing or determining the inorganic constituents of samples. Furthermore, because of their size, simplicity and portability, the present means can be used by simply placing them on or against a specimen to be analyzed such as against a portion of a vehicle or other relatively large object and used to non-destructively test the composition of the material of said object.

A principal object of the present invention therefore is to provide improved means for determining the elemental composition of materials.

Another object is to provide qualitative analysis means that do not damage or destroy the substance or object being tested or analyzed.

Another object is to provide portable X-ray spectrographic means.

Another object is to reduce the time required to investigate spectrographically the elemental constituents in a material or object.

Another object is to provide an X-ray spectrographic device which has no moving parts.

Another object is to provide an X-ray spectrographic camera which is relatively simple structurally and relatively inexpensive.

Another object is to provide an X-ray spectrographic camera which can utilize commonly available X-ray sources as its excitation source.

Another object is to provide an X-ray spectrographic device which is capable of being positioned on large samples for non-destructive analyses thereof.

Another object is to provide semi-quantitative elemental analysis means suitable for analyses of very small quantities of materials.

Another object is to provide a spectrographic camera which can determine and/or record the frequencies and intensities of X-ray emissions from a sample even when the emissions are over a relatively wide frequency band.

Another object is to provide X-ray spectrographic means which require relatively less power to operate.

Another object is to provide excitation sources for X-ray spectrographic means whose output energy level can be varied and controlled as desired.

Another object is to provide X-ray spectrographic means whose excitation energy level can be readily synchronized to the frequency of the X-rays being emitted by the material under analysis so that the energy supplied by the excitation source is proportional to the energy, and hence the frequency, of the emitted X-rays in accordance with Planck's Law.

Another object is to reduce high order and background interference in an X-ray spectrograph.

Another object is to increase the precision of X-ray spectrographic analysis particularly for the lighter elements.

Another object is to provide X-ray spectrographic means which are compatible with automated systems so they can be used on production lines or the like for monitoring, inspecting and/or testing.

Another object is to provide means for distinguishing and sorting various materials such as alloys which are otherwise generally indistinguishable.

Another object is to provide X-ray spectrographic means which can analyze small samples such as samples of microgram quantity.

Another object is to provide spectrographic X-ray means whose operations are unaffected or improved by prolonged exposure to a hard vacuum such as in space.

Another object is to provide means suitable for the determination of heavy element impurities in evaporated or very thin films.

Another object is to provide X-ray spectrographic means which can be operated by relatively unskilled personnel.

These and other objects and advantages will become apparent to those skilled in the art after considering the following detailed specification which covers several preferred embodiments of the invention in conjunction with the drawings wherein:

FIG. 4 is a cross-sectional elevational view taken on line 4—4 of FIG. 3;

FIG. 5 is a fragmentary side elevational view of another embodiment of the subject device similar to the device of FIGS. 3 and 4;

FIG. 6 is a fragmentary cross-sectional view taken on line 6—6 of FIG. 5; and,

FIG. 7 is a schematic representation of still another embodiment of the present device.

Figure 1:
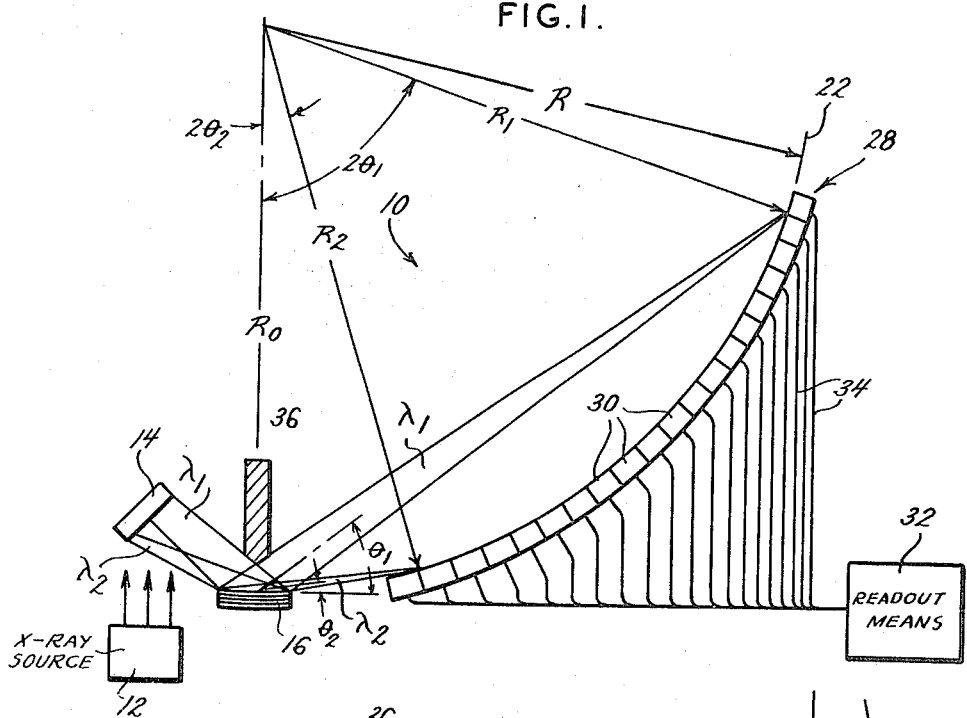
FIG. 1 is a schematic cross-sectional representation of the present invention.

Referring to the drawings more particularly by reference numbers, number 10 in FIG. 1 refers to a preferred embodiment of a device constructed according to the present invention. The device 10 includes an excitation source 12 whose output is directed toward a sample 14 of material to be analyzed. The source 12 may be an X-ray source, an electron gun, a proton gun, a radioactive source or any other source capable of producing and directing energy against a material such as the sample 14 at sufficient intensity to cause the sample 14 to emit characteristic X-rays therefrom. For simplicity of explanation, the sample 14 can be assumed to be constructed of two elemental constituents that have a relatively large difference between their atomic numbers. X-rays of different characteristic wavelengths such as the X-rays $\lambda_1$ from the lighter constituent and $\lambda_2$ from the heavier constituent are shown emitting from the sample 14. The emissions are directed toward a curved analyzing crystal 16. The X-rays of single wavelengths $\lambda_1$ and $\lambda_2$ and hence from single elemental constituents of the sample 14 are shown as emitting from portions of the sample. Other X-rays of the same wavelength also emit from the sample 14 but they are at the wrong position or angle to be scattered in an ordered manner by the diffraction grating characteristics of the crystal 16.

Figure 2:
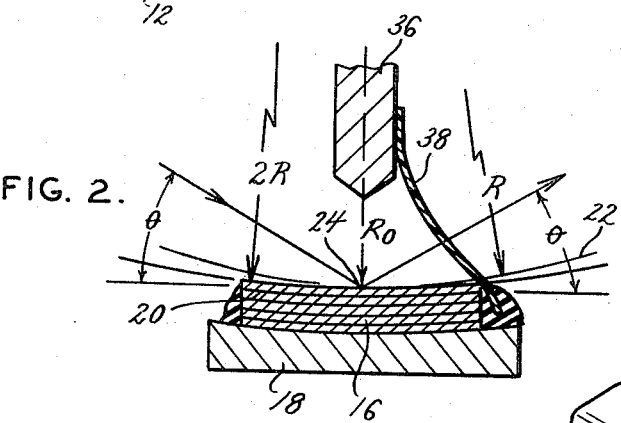
FIG. 2 is an enlarged fragmentary cross-sectional view through the crystal portion of the device of FIG. 1.

The curved analyzing crystal 16 as shown in enlarged idealized cross-section in FIG. 2 can be constructed from various crystal materials such as, for example, gypsum, mica, sodium chloride, lithium floride or other alkali halides. The crystal 16 is also bent either elastically by being placed or securely mounted against a curved crystal mount 18 or by being permanently deformed such as by pressing it between male and female dies. This bending or deformation is done so that the reflecting set of atomic planes 20 of the crystal 16, shown in representative form only, form an arc of a cylinder. When the crystal 16 is bent or deformed to the desired curvature such as the curvature 2R shown, the approximate focal circle 22 of the crystal 16 has a radius R and is approximately tangent to the midpoint 24 or midline of the bent crystal 16 as shown.

Figure 2A:
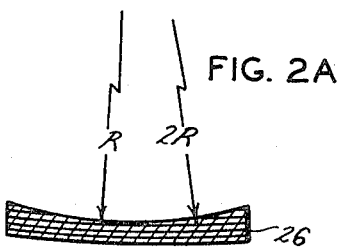
FIG. 2A is an enlarged fragmentary cross-sectional view through another crystal which can be used in the device of FIG. 1.

The crystal 16 in addition to having crystal planes 20 bent or deformed to a radius 2R may be ground and etched as shown in FIG. 2A to form a surface of radius R thereon to provide a perfect focusing crystal 26 since crystals having merely curved crystal planes and surfaces parallel thereto only approximately focus the X-rays which strike them on the focal circle R, the error in focus becoming greater the farther the X-rays strike the crystal 16 away from its midpoint 24 or point of tangency with the focal circle 22. It is usually unnecessary to provide a crystal such as crystal 26 that is both bent and ground, however, since accurate and highly precise results can be obtained from the present device 10 using the crystal 16, and to accurately grind such a crystal 16 after it has been bent is extremely difficult, especially when certain types of crystals such as foliated crystals are involved.

The X-rays of wavelength $\lambda_1$ and $\lambda_2$ which are shown emitting from the sample with the proper angles with respect to the crystal planes 20, diffract from the curved crystal 16 with first order characteristic angles $\theta_1$ and $\theta_2$ respectively equal to their incident angles. When the X-rays of a single wavelength such as $\lambda_1$ strike the crystal 18 at a greater or lesser angle than their characteristic incident angle $\theta_1$ they are not scattered by the analyzing crystal 16 in an ordered manner. $\theta_1$, the incident or diffracted angle, can be conviently measured between a tangent to the crystal plane 20 at the point on the crystal 16 where the incident X-rays impinge and the plane of diffracted X-rays as shown in FIG. 2.

Detector means 28 are provided in proximity to the focal circle 22 in a position to intercept X-rays reflected off the crystal 16 and focused thereby. The X-rays such as X-rays of a specific wavelength $\lambda_1$ strike the detector means 28 at a predeterminable position along the focal circle 22 which is dependent on the angle of diffraction $\theta_1$. An angle of diffraction $\theta_1$ or any $\theta$ can be conveniently measured at the detector means 28 since the angle between the radius of the focal circle 22 drawn to the midpoint 24 of the analyzing crystal 16 which is shown as being $R_o$ and the radius $R_1$ to the point of focus of the X-rays of wavelength $\lambda_1$ on the detector means 28 equals $2\theta_1$.

The detector means 28 may include one or a plurality of individual detector elements 30 as shown in FIG. 1 which are responsive to X-radiation. When the detector means 28 include a plurality of detector elements 30 such as solid state, scintillation or proportional detector elements, each is coupled to an associated readout means 32 which may include amplifier means, recorder means, counter means, pulse height discriminator means and/or indicator means. These connections are shown in FIG. 1 as the connections 34. Other means can be used as the detector means 28 including photographic film or phosphor intensified film packs which are positioned extending along the focal circle 22 or along a cord thereof and these will be described in more detail later.

Also included in the device 10 is a divergence aperture edge member 36 which is positioned in spatial relationship to and facing the midpoint 24 of the crystal 16. The member 36 is provided so that X-rays, such as X-rays of wavelength $\lambda_1$, that have a large diffraction angle $\theta_1$ can strike and be diffracted by the crystal 16 onto the detector means 28 and at the same time prevent any X-rays from passing directly from the sample 14 to the detector means 28 without having been first diffracted by the crystal 16.

Since some sample materials and/or analyzing crystals phosphoresce or fluoresce visible radiation when exposed to high energy particles or rays, a light screen 38 may be optionally provided between the aperture edge member 36 and the crystal mount 18 to prevent the visible light generated from adversely effecting the detector means 28. The light screen 38 can be made from materials such as aluminized Mylar which do not appreciably attenuate the X-rays passing therethrough but which effectively block visible light. A light screen such as the light screen 38 is particularly desirable when the detector means 28 include means such as film or other detectors which are sensitive to energy having wavelengths in the visible spectrum.

Figure 3:
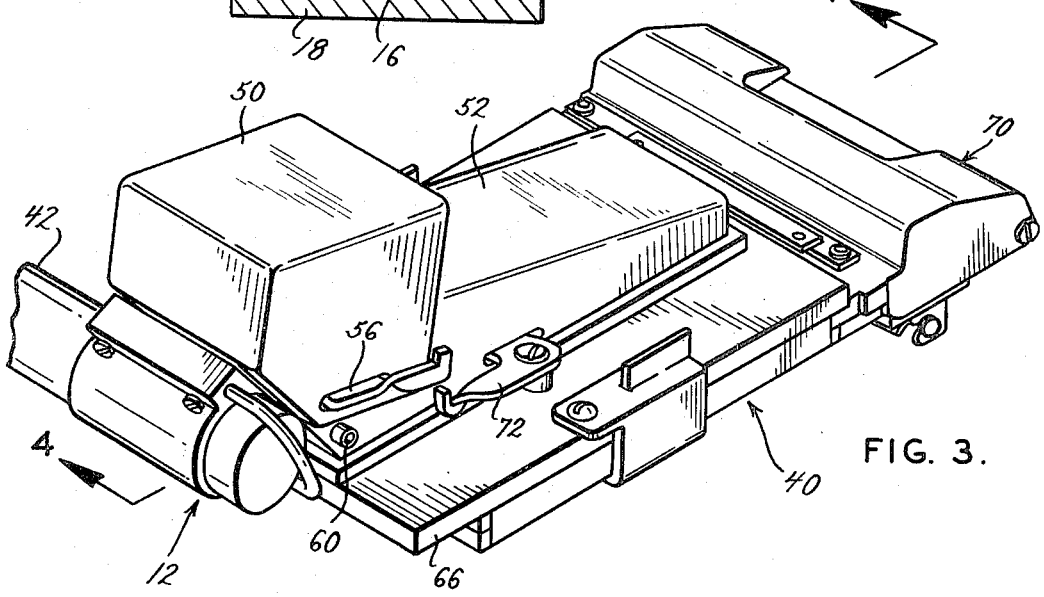
FIG. 3 is a perspective view of an X-ray spectrographic camera embodying the teachings of the subject invention.

FIG. 3 shows a specific embodiment of the device 10 of FIG. 1 in the form of a spectrographic camera 40 which utilizes film as the detector means 28. The camera 40 is shown in cross-section in FIG. 4 and includes an X-ray tube 42 in the excitation source 12. The X-ray tube 42 is positioned close to the sample or specimen 14 so that a maximum amount of X-ray energy is directed against the sample 14. A collimator 44 constructed of suitable X-ray absorbing material such as lead is positioned between the X-ray tube 42 and the sample 14 to form the output of the tube 42 into a beam of X-rays aimed to directly irradiate the exposed portion of the sample 14. A sample face plate 46 on the camera 40 is positioned against the sample 14, and the face plate 46 has a window 48 formed therein which exposes a certain portion or area of the sample 14 to the radiation output of the tube 42. The sample window 48 is preferably oversized so that the X-ray beam does not irradiate the sample face plate 46 which otherwise might emit X-rays in accordance with its elemental constituents.

The sample 14 is positioned against the sample face plate 46 in the sample window 48 either by positioning the sample in a sample housing 50 which is included to hold samples and particularly relatively small samples or by the camera 40 and the plate 46 being positioned directly upon the surface of larger samples such as against a portion of a vehicle, a boulder, a building or other sample or specimen to be analyzed. As shown, the sample housing 50 fits flush against a camera housing 52. The sample face plate 46 is surrounded by an adjacent upper surface 54 of the camera housing 52 which surface is shown as being flat. When the sample housing 50 is removed, the upper surface 54 facilitates the aforementioned positioning on large objects. The surface 54 can, however, have other shapes depending on the shape and contour of the specimen without departing from the spirit and scope of the invention. Both of the housings 50 and 52 are constructed from materials which do not permit the passage of X-rays therethrough and the sample housing 50 is preferably closely fitted to the camera housing 52 and can be clamped thereto, if desired, by suitable means such as the lever and slot means 56. This assures that the sample housing 50 and the camera housing 52 will not permit the escape of X-rays therebetween which otherwise might present a potential hazard to personnel in the area of the camera 40. The small sample housing 50 can also include sealing means 58 which are positioned to form an airtight seal between the housings 50 and 52. When used on large samples without the sample housing 50 a lead curtain may be placed around the window 48 and the sample to prevent escape of radiation.

The construction and location of the analyzing crystal 16 is very important to the present invention. The crystal 16, for example, is positioned inside the camera housing 52 adjacent the collimator 44 and generally opposite from but in line-of-sight of the sample 14. The crystal 16 is positioned with respect to the X-ray tube 42 and the sample 14 so that the X-rays from the X-ray tube 42 that are undesirably scattered rather than photoelectrically absorbed by the sample 14 must scatter at an angle of about 90° relative to their original direction from the tube 42 to reach the crystal 16. The X-rays from the X-ray tube 42 impinging on the sample 14 that are not photoelectrically absorbed are scattered by the sample 14 either coherently without the loss of energy or incoherently whereby part of their energy is lost. This scattering of the X-rays from the X-ray tube 42 by the sample 14 can result in false spectral lines or a sizeable undesirable background intensity of divergent X-rays at the detector means 28 since the analyzing crystal 16 diffracts these undesirably scattered X-rays along with the fluorescent X-rays produced in the sample 14. Orienting the X-ray tube 42, the sample 14 and the crystal 16 so the undesirably scattered X-rays from the X-ray tube must be scattered at an angle of 90° to their original direction in order to be "seen" by the analyzing crystal 16, plane polarizes both the coherently and incoherently scattered X-rays from the X-ray tube which reduces the amount thereof reaching the detector means by about 50 percent. These scattered X-rays from the tube 42 are sometimes still detectable as spectral lines characteristic of the wavelengths in the coherently scattered tube spectrum. Diffuse lines on the low energy side of each spectral line are formed by the incoherently scattered X-rays which are also diffracted by the crystal. These diffuse lines are particularly evident when samples having elemental constituents of low atomic number are being examined.

The type of ordered X-ray scattering for which the analyzing crystal 16 or 26 is intended as aforesaid is coherent Bragg diffraction by a specific set of atomic planes. In the case of curved crystal analysis, the incident radiation is focused by diffraction onto the focal circle. Higher order diffractions from the same atomic planes are likewise focused. This can be useful in certain instances in that a wider range of wavelengths can be analyzed and in other cases it can be detrimental since the higher order diffractions may interfere by masking certain first order lines especially when the sample contains elemental constituents of widely varying atomic number and also by diffracting the X-rays from the X-ray tube 42 scattered by the sample 14 as aforesaid. Some types of crystals, such as crystals of LiF, Ge and $CaF_2$ which generate weak higher order diffractions, to some extent reduce the detrimental background effects of the higher order lines at the detector means 28. Pulse height discrimination at the detectors can also eliminate some of these background interference problems but when film is used as a detector as in FIGS. 4 and 5 only a proper crystal choice can reduce the intensity of this type of background interference.

Scattering due to structural irregularities in the crystal, incoherent scattering and the fluorescent characteristic X-rays from the crystal 16 can also add to the background X-ray intensity to lower the sensitivity of the device. The intensities of these objectionable divergent or background X-rays which reach the detector means 28 are proportional to the inverse of the square of the distance between the crystal 16 and the point on the detector means 28 at which the measurement of $\theta$ is made. Therefore, in some embodiments of the present device, a relatively large crystal radius and hence large focal circle radius is used to minimize the divergent components. The decrease in the desired characteristic X-ray intensities due to increased absorption by matter in the longer beam path from the crystal 16 to the detector means 28 of large focal circle radius can be reduced by changing the matter in the beam path from air at atmospheric pressure to a lighter gas such as helium or by removing the air to create a vacuum. By purging the interior of the camera 40 with a light gas such as helium or drawing a vacuum in the interior through a port 60 through the camera housing 52 which communicates with the interior thereof adjacent the crystal 16, the decrease in spectral intensities due to the relatively long beam path can be reduced or eliminated since the helium or vacuum environment inside the camera 40 greatly reduces the X-ray absorption in the beam path as stated. This reduction in intensity loss is especially important when lighter elements are being analyzed since in such a camera 40 the beam path is longer for lighter elements than for heavier elements and since the energies of the characteristic X-rays of lighter elements are also lower than those of the heavy elements they are subject to more absorption in the beam path between the crystal 16 and the detection means 28.

At ordinary environmental temperatures there is also always an additional small amount of diffuse X-ray scattering or background about the Bragg angle $\theta$ due to thermal vibrations of the atoms in the crystal. This thermal background or scattering can be reduced or eliminated in the present device by introducing the above mentioned helium into the camera housing 52 at reduced temperatures to thereby cool the crystal 16 and reduce or minimize the thermal effects.

The divergence aperture edge member 36 is preferably positioned above the midpoint 24 of curved crystal 16 (FIG. 2) as aforesaid. The edge member 36 is connected to the camera housing 52 by means such as the bolts 62 which are positioned in associated elongated slots in the member 36 so its height above the crystal 16 can be adjusted. This is especially desirable when using the bent approximate focus crystals 16 described above since by adjusting the aperture edge member 36 closer to the crystal 16 the divergent or out-of-focus X-rays reflected from the outermost portions of the curved crystal reflecting plane can be reduced. Of course, by adjusting the member 36 closer to the crystal 16, the total amount of X-rays that reflect from the crystal 16 are reduced since the effective reflecting surface of the crystal is thereby also reduced. This is especially true for the longer wavelength X-rays. Therefore when adjusting the aperture edge member 36 some compromise must be reached between line discrimination at the detector means 28 and the total intensity of the radiations reaching the detector means 28. The adjustable feature is most desirable when the camera 40 is to be used with different crystals since no two crystals are exactly the same. In the usual case, however, the aperture edge member 36 will be adjusted when the camera is initially calibrated and never moved thereafter.

The lower portion 66 of the camera housing 52 as shown in FIG. 4 includes an opening 68 which is covered and sealed by the detector means 28. The detector means 28 shown in FIG. 4 is a film cassette 70 which is attached to the camera housing 52 by slot and lever mean 72 (FIG. 3) which are similar to the slot and lever means 56 which attach the sample housing 50 to the camera housing 52. The cassette 70 includes a curved film supporting portion 74 along which the film 76 is supported. The curved portion 74 locates the film 76 along a circle which approximates the focal circle 22 of the crystal 16. The spectrum of X-rays diffracted by the crystal 16 is therefore focused on the film 76. After a proper exposure time which depends in part on the film speed and the power applied to the X-ray tube 42, the X-ray tube 42 is deenergized and the film 76 is developed. The positions on the film 76 where the X-rays from the crystal representing the constituents contained in the sample are focused will appear as lines on the film, and these lines can be calibrated to indicate the characteristic X-ray wavelengths and hence the elemental constituents of the sample 14. The cassette 70 can be rounded as shown to follow the approximate focal circle for greatest accuracy or it can be made flat (FIG. 5) in which case the lines will have to be calibrated or determined in a somewhat different manner. The cassette can also be of a more or less conventional construction such as a Polaroid type cassette so that the film can be processed without requiring any darkroom or other film processing facilities and so the film 76 can be developed quickly. As can be seen in FIG. 4, the film cassette 70 mates with the lower portion 66 of the camera housing 52 which may include sealing means 78 so that a dark and airtight condition of the interior of the camera housing 52 can be maintained.

FIG. 5 shows the camera 40 and an attached Polaroid type cassette 80 which contains and supports the film 82 in a flat rather than in a curved condition. The focal circle 22 of the crystal, shown in dash lines, intersects the film 82 at two intermediate positions which are the only places where the X-rays are in exact focus. Everywhere else the film 82 is only closely adjacent to the focal circle 22 and therefore at these other locations, the X-rays are out of focus to some extent. In this case, the film 82 is located on a cord of the focal circle which accounts for the somewhat out-of-focus condition. For certain purposes such as when the X-ray spectrum to be detected is not expected to include closely spaced lines, or when the only lines of interest are expected to be at or near to the exactly focused lines, or when some defocusing is not objectionable, the flat cassette 80 may be preferred over the curved cassette 70 because the flat construction may be cheaper and easier to operate. Also in the curved cassette construction 70 it is sometimes difficult to maintain the film 76 in a smooth curved position against film supporting portion 74 without introducing some distortion or wrinkling thereof which can cause wavy spectral lines to be produced. In flat type cassettes like the cassette 70 wrinkles are relatively easily prevented by spring type members or other means (not shown) positioned along the sides of the film 82.

As shown in FIG. 6 the camera 40 can include a crystal assembly 88 that has a plurality of similar crystals such as the three crystals 16a, 16b, and 16c. Thin shields 90 constructed from a material such as lead or tungsten are positioned between the crystals 16a, 16b and 16c and extend therefrom to adjacent to the film 82 so that one, two, three or more as desired different X-ray spectral patterns can be recorded on the film 82 at the same time. By properly choosing the analyzing crystals 16a, 16b and 16c so their Bragg angles to specific X-ray wavelengths are substantially different, the complete X-ray spectrum of a sample 14 having elemental constituents with relatively great differences in the atomic number can be recorded simultaneously. The shields 90 can also be extended to adjacent the sample face plate 46 so that more than one sample can be analyzed simultaneously on the same film. As aforesaid, simultaneous analysis of multiple samples is especially convenient when a sample of unknown material is to be compared to a sample of a known and supposedly identical material since the spectral lines which appear on the film during such an analysis should be identical and this can be detected relatively easily even by persons having relatively little skill and training.

FIG. 7 is a representation of another embodiment of spectrographic means 100 which are also constructed according to the present invention. In the previous embodiments, the wavelengths of the characteristic X-rays were determined at the detector means 28 by determining the angle $\theta$ at which they reflected from the analyzing crystal 16. In the embodiment 100 on the other hand the wavelengths of the chracteristic X-rays are determined by generating X-rays at various incident angles to the analyzing crystal and observing at what incident angles there are reflected X-rays.

In the particular embodiment shown in FIG. 7 a beam 102 of electrons from an electron gun 104 is directed toward the sample 14 (which is shown as being a curved member) by beam deflection means 106 which control beam deflection coils 107. The beam 102 is used to excite the sample 14 to produce characteristic X-rays therefrom and since such electron beam excitation can be as much as 10,000 times more efficient in producing characteristic X-radiation than the more conventional X-ray tube excitation, the power requirements for means 100 are substantially less than for the constructions discussed above. An analyzing crystal 16 (or 26 or crystals 16a, 16b and 16c) are employed to diffract the X-rays to the detector means 28. As in the other embodiments the crystal or crystals can be either bent approximate focus crystals 16 as aforesaid or bent and ground perfect focus crystals as in the case of crystals 26 discussed above. The sample 14 is positioned on or in close proximity to the focal circle 108 which has a radius R, when the diffracting atomic planes in the analyzing crysal 16 or 26 are bent to a radius of 2R. The normal plane 110 to the diffracting planes at the midpoint of the crystal 16 passes through the axis 112 of the focal circle 108 and through a member 36a which serves the same purposes as the aperture edge member 36 discussed above. The sample 14 is bombarded by the electron beam 102 preferably at points which are effectively along the focal circle 108. The characteristic X-rays which are generated upon bombardment by electrons at any one point on the sample 14 can be diffracted by the analyzing crystal 16 or 26 and passed to the detector means 28 shown as a radiation detector 114, only if they are of a certain predeterminable wavelength as determined by the Bragg equation $n\lambda = 2d \sin \theta$, where $\theta$ equals one-half the angle between the normal plane 110 of the crystal 16 and the electron beam 102 as shown.

The X-ray spectrum of the sample 14 can be scanned by sweeping the electron beam 102 along the sample 14 through a range of deflection angles $\theta$ and observing at which $\theta$ angles X-rays are reflected by the crystal 16 into the radiation detector 114. The output of the radiation detector 114 can by synchronized with the deflection means 106 and hence with the instantaneous deflection of the electron beam 102 so that the wavelength and the intensity of the characteristic X-rays detected can be instantaneously determined and the information fed to conventional means 116 such as to a cathode ray tube, a multi-channel analyzer, a tape recorder, or a strip chart recorder for storage and/or display, and it is also possible with a slight modification to project the reflected X-rays onto a film strip as discussed above.

The beam deflection means 106 can also be synchronized with the voltage in the electron gun 104 by voltage control means 118 so that the peak electron accelerating voltage will correspond to the beam deflection at which the highest energy or the shortest wavelength X-rays are detected. Lower electron beam voltages are used when the beam 102 strikes the sample 14 at positions corresponding to greater $\theta$ angles with respect to the crystal 16 where relatively lower energy, longer wavelength X-rays are diffracted to the detector means 28. This variable electron beam voltage matched to the energies of the diffracted and detected X-rays lessens the severity of higher order interferences and reduces background intensity making the means 100 more sensitive especially to the trace elements and to the relatively lighter weight elements.

By utilizing electron beam scanning, the means 100 can be made to scan at much higher rates than can the more conventional scanning type spectrographic devices. At such higher scan rates, the time for each scan is relatively short, so short in fact that the output of the excitation source 12 even without the expensive high voltage current stabilizers such as are required in the more common scan type X-ray spectrographic devices cannot vary appreciably during any one sweep. The detector means 28 take an average of many scans to produce quantitative data about the sample 14 so the relative amounts of each elemental constituent present in the sample 14 can be determined no matter how the excitation source output may undesirably vary.

It should now be apparent that the sample 14 in the means 100 is in effect the target of an X-ray tube and therefore as in an X-ray tube construction a vacuum or controlled environment must be maintained therein. The sample 14 can be placed in the vacuum system for electron bombardment by means of an environmental lock or in some cases by being positioned outside the means 100 against a thin window constructed of material through which the electron beam and the characteristic X-rays produced thereby can penetrate. The sample 14 may also be in a powder or thin film form and as such sprinkled or distributed over the curved focal circle on suitable means (not shown). For some substances such as for those which do not conduct electricity, dilution in a conducting substance may be necessary for electron beam stability and this diluted material may be positioned in a curved tube (also not shown).

The means 100 are an improvement over the more conventional spectrographic means particularly for analyzing substances containing certain of the lighter weight elements such as sodium, florine, oxygen, nitrogen, carbon and boron which heretofore have not been possible to analyze accurately using existing devices. Furthermore, since there are no moving parts in the means 100 as there are in the known scanning type X-ray spectrographic devices, the means 100 are inherently more rugged and able to withstand severe vibration, shock, hard landings, and other rough treatment without being destroyed or made useless. Also since there are no moving parts, the problems often encountered in attempting to keep precise mechanical movements lubricated when exposed to a vacuum or to prolonged heat or cold are eliminated. This makes the means 100 especially attractive for utilization in the vacuum conditions and temperature extremes encountered in space.

Thus there has been shown and described novel X-ray spectrographic analysis means which are capable of qualitative and quantitative analysis of the elemental constituents of sample substances, which means fulfill all of the objects and advantages sought therefore. Many changes, modifications, alterations, variations and other uses and applications of the subject means will, however, become apparent to those skilled in the art after considering this specification and the accompanying drawings. All such changes, modifications, alterations, variations and other uses and applications which do not depart from the spirit and scope of the invention are deemed to be covered by the invention which is limited only by the claims which follow.

What is claimed is:

1. Spectrographic means for analyzing the elemental constituents of samples including housing means, means for supporting and exposing a sample therein, means for producing a beam of energy including means to direct said energy beam toward the exposed sample in the housing whereby the sample is stimulated by said energy to give off X-rays of wavelengths that are characteristic to the elemental constituents of which the same is constructed, the relative intensities of said X-rays depending in part upon the relative amount of each elemental constituent present in the sample, a crystal member fixedly positioned in said housing in position to intercept at least some of the X-rays given off by the sample, said crystal member having an arcuately curved crystalline surface the axis of which is oriented generally at right angles to the X-rays given off by the sample, said crystal member diffracting and focusing the X-rays of different wavelengths intercepted thereby to locations lying along a focal circle which is tangent to the curved crystalline surface, the radius of the focal surface being approximately equal to one-half of the radius of the arcuately curved crystalline surface, said sample supporting and exposing means being located to position at least part of the sample inside the focal circle for exposure thereat to the energy beam, means including an X-ray blocking member positioned in the housing means and extending to adjacent the crystal member on the side thereof that intercepts the X-rays given off by the sample toward the point where the focal circle and the arcuately curved surface of the crystal are tangent, the position of the X-ray blocking member relative to the crystal member defining an angular range of X-ray wavelengths that can be diffracted and focused by the crystal member onto the focal circle, and detector mean positioned on the opposite side of said X-ray blocking member from said sample, at least a portion of the detector means being located on the focal circle, said X-ray blocking member being spaced from the crystal member a distance such that substantially only those X-rays that are intercepted and diffracted and focused by the crystal member within the defined angular range of wavelengths will be able to reach the detector means.

2. The means defined in claim 1 wherein said means for producing a beam of energy is an electron gun, said means to direct said beam of energy toward the sample including means for aiming said beam of electrons at predetermined positions on the sample, and means for establishing a substantially evacuated environment in said housing means.

3. The means defined in claim 2 wherein said detector means include an X-ray sensitive element, and readout means connected to receive outputs therefrom, said readout means also being connected to said electron beam aiming means and being coordinated therewith and responsive to outputs from the X-ray sensitive element to produce readouts which are indicative of the wavelengths of the X-rays generated by the electron bombardment of the sample.

4. The means defined in claim 2 wherein said detector means include an X-ray sensitive element, and readout means connected to receive outputs therefrom, and wherein said electron beam aiming means include means to move the beam to scan the exposed sample surface in a predetermined manner, said readout means being connected to said electron beam scanning means to correlate the position of the beam on the sample to the outputs from the X-ray sensitive element to provide readouts indicative of the wavelengths and intensities of the X-rays generated by the electrons bombarding the sample during scanning thereof.

5. The means defined in claim 1 including a plurality of curved crystal members positioned in side-by-side relationship adjacent to said X-ray blocking member.

6. The means defined in claim 5 including X-ray impervious shield members positioned between adjacent curved crystal members and extending therefrom to the detector means to divide the detector means into portions each of which is exposed to X-rays diffracting off one of said crystal members and to prevent X-rays being diffracted by adjacent crystal members from producing responses on the detector portions associated with the other crystal members.

7. The means defined in claim 6 wherein said sample exposing means include means for supporting a plurality of the samples in side-by-side relationship, said X-ray impervious shields extending from between adjacent crystal members to between adjacent samples.

8. The means defined in claim 1 wherein said detector means are located extending along an arc of the focal circle.

9. The means defined in claim 1 wherein said detector means are located in a plane which intersects the focal circle.

10. The means defined in claim 1 wherein said beam producing means include a radioisotope.

11. The means defined in claim 1 wherein said beam producing means include a proton gun.

12. The means defined in claim 1 including screen members capable of passing X-rays but not light positioned extending across the space between the blocking member and the crystal member.

13. The means defined in claim 1 including means for adjusting the position of the X-ray blocking member relative to the crystal member.

14. The means defined in claim 1 including means for establishing predetermined controlled environmental conditions in the housing means.

15. The means defined in claim 1 including means for establishing a predetermined temperature inside the housing means.

16. The means defined in claim 1 wherein said crystal member includes a plurality of parallel curved crystalline planes having radii R and a concave curved X-ray diffraction surface extending along the focal circle thereof.

17. X-ray spectrographic means for the elemental analysis of samples including a housing, an electron gun positioned to generate a beam of electrons in said housing, means for supporting a sample to be analyzed in the housing in position to be exposed to the beam of electrons, means to direct the electron beam at predetermined locations on the sample in such a manner that at least some of the electrons are photoelectrically absorbed thereby so the sample emits X-rays from the said predetermined locations of wavelengths that are characteristic of the elemental constituents thereof, non-movable X-ray diffraction grating means in said housing, said grating means having an arcuately curved surface of radius R in position to intercept X-rays emitting from predetermined locations on the sample and to selectively diffract and focus said X-rays on a focal circle that is tangent at one point to the arcuately curved surface of the diffraction grating means, said focal circle having a radius substantially equal to R/2, X-ray detector means positioned in the housing to intercept said diffracted X-rays, at least a portion of the detector means being located on the focal circle, and means to limit the angular range of X-rays from the sample diffracted by the diffraction grating means that are able to be intercepted by the detector means, said angular range limiting means including an X-ray blocking member positioned in the housing between the sample and the detector means and extending toward the said point of tangency of the focal circle and the diffraction grating means.

18. The means defined in claim 17 wherein said predetermined locations on the sample are along a locus of points from each of which X-rays of a predetermined wavelength diffract off said grating means in an ordered manner.

19. The means defined in claim 17 including means connected to said electron beam directing means and to said X-ray detector means for producing outputs which depend on the location at which the electron beam is directed and on responses of the X-ray detector means to intercepted X-rays, said outputs being indicative of the elemental constituents in the sample.

20. The means defined in claim 17 including means connected to said electron gun and to said electron beam directing means to control the energy of the electrons in the electron beam in a manner dependent on the location where the beam impinges on the sample.

21. X-ray spectrographic means for performing elemental analysis of samples including housing means, means for supporting and exposing a sample therein, means for producing a beam of energy directed at the exposed sample whereby the sample is stimulated to emit X-rays of wavelengths that are characteristic of the elemental constituents of which the sample is composed, crystal means fixedly positioned in the housing in position to intercept X-rays emitted by the sample, said crystal means having crystalline planes forming an X-ray diffraction grating which has an arcuate shape of radius R where R is the radius of a cylindrical surface whose axis is generally at right angles to the direction the X-rays are emitted by the sample and intercepted by the crystal means, said crystal means diffracting and focusing X-rays of different wavelengths intercepted thereby to positions on a focal circle, which focal circle has at least one point thereon that is coincident with at least one point on said crystalline planes, which focal circle has a radius equal to approximately one-half the radius R, said sample supporting and exposing means positioning the sample so that at least part of the sample is exposed to the energy beam at a location that is within the focal circle, means including an X-ray blocking member positioned in the focal circle and extending to a position spaced from but adjacent to said crystalline planes, and X-ray detector means positioned at least in part on the focal circle and on the opposite side of said X-ray blocking member from said sample, said X-ray blocking member being spaced from the crystalline planes a distance such that a preselected angular range only of X-ray wavelengths emitted by the sample and impinging on the crystal will be diffracted by the crystal and focused on the detector means.

22. The means defined in claim 21 wherein said detector means include an array of adjacent radiation sensitive elements positioned extending substantially along a portion of the focal circle, and readout means having connections to the sensitive elements in said array for producing output signals representative of the elemental constituents of the sample.

23. The means defined in claim 22 wherein said readout means include pulse height discrimination means.

24. The means defined in claim 21 wherein said detector means include a strip of X-ray sensitive film.

25. X-ray spectrographic means for the elemental analysis of samples including a housing, a source of radiation energy positioned to generate a beam of electrons in said housing, means for supporting a sample to be analyzed in the housing in position to be exposed to the beam of electrons, means to direct the electron beam at the sample in such a manner that at least some of the electrons of the beam are photoelectrically absorbed by the sample whereby the sample emits X-rays of wavelengths that are characteristic of the elemental constituents of the sample, X-ray diffraction grating means fixedly positioned in said housing and having an arcuately curved surface in position to intercept some of the X-rays emitting from the sample, said grating means diffracting and focusing the different wavelength X-rays impinging thereon from the sample at different points along a focal circle depending on their wavelengths, said focal circle having at least one point that is coincident with a point on the arcuately curved surface of the diffraction grating means and having a radius that is approximately one-half the radius of the arcuately curved surface of the diffraction grating means, X-ray detection means positioned in the housing in position to be exposed to said diffracted and focused X-rays, at least a portion of said detection means being located on the focal circle, and X-ray shielding means positioned in the housing between the sample and the detection means, said shielding means extending to adjacent the curved surface of the diffraction grating means at the said one point where the focal surface is coincident therewith to control the angular spectrum of diffracted X-rays from the sample that are able to reach the detection means.

* * * * *